United States Patent
Lee

(10) Patent No.: US 8,655,356 B2
(45) Date of Patent: Feb. 18, 2014

(54) METHOD FOR SCANNING NETWORK IN MOBILE STATION AND THE MOBILE STATION USING THE SAME

(75) Inventor: Sang Hyun Lee, Seoul (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 1335 days.

(21) Appl. No.: 12/022,204

(22) Filed: Jan. 30, 2008

(65) Prior Publication Data

US 2008/0274737 A1 Nov. 6, 2008

(30) Foreign Application Priority Data

May 4, 2007 (KR) .................. 10-2007-0043324

(51) Int. Cl.
*H04W 4/00* (2009.01)
*H04W 36/00* (2009.01)

(52) U.S. Cl.
USPC ......... 455/434; 455/437; 455/436; 455/422.1

(58) Field of Classification Search
USPC .................. 455/437, 434, 436, 422, 442
See application file for complete search history.

(56) References Cited

U.S. PATENT DOCUMENTS

2005/0079870 A1* 4/2005 Rick et al. .................. 455/437
2007/0042775 A1* 2/2007 Umatt et al. ............... 455/434

FOREIGN PATENT DOCUMENTS

KR 2006-98729 9/2006 ............ H04B 7/26
KR 2007-8050 1/2007 ............ H04N 5/50

OTHER PUBLICATIONS

3GPP, 3rd Generation Partnership Project; Technical Specification Group Core Network; Mobile radio interface layer 3 specification (Release 1998), 3GPP TS 04.08 V7.21.0 (Dec. 2003).*
3GPP; 3GPP TS 23.122 V6.4.0 (Mar. 2005); "3rd Generation Partnership Project; Technical Specification Group Core Network; Non-Access-Stratum (NAS) Functions Related to Mobile Station (MS) in Idle Mode (Release 6)."

* cited by examiner

*Primary Examiner* — Opiribo Georgewill
(74) *Attorney, Agent, or Firm* — Cha & Reiter, LLC

(57) ABSTRACT

A network scanning method in a mobile station and the mobile station using the method are disclosed, which can efficiently scan a network intended to be selected. The method includes: requesting a network selection, and scanning frequencies in an order starting from the highest receive-level of each frequency; detecting a carrier having network information during the scanning, and acquiring the network information; and sorting carrier frequencies and non-carrier frequencies of respective networks, based on the acquired network information. The frequency scanning is performed only for carrier frequencies. Therefore, corresponding services are provided rapidly to users.

16 Claims, 3 Drawing Sheets

METHOD FOR SCANNING NETWORK IN MOBILE STATION AND THE MOBILE STATION USING THE SAME

CLAIMS OF PRIORITY

This application claims priority to an application entitled "METHOD FOR SCANNING NETWORK IN MOBILE STATION AND THE MOBILE STATION USING THE SAME," filed in the Korean Intellectual Property Office on May 4, 2007 and assigned Serial No. 2007-0043324, the entire contents of which are incorporated herein by reference.

BACKGROUND OF THE INVENTION

1. Field of the Invention

The present invention relates to mobile communication technology, and more particularly, to a method that efficiently scans a network intended to be selected by a mobile station, and to a mobile station using the method.

2. Description of the Related Art

In general, a mobile station (MS) selects a network by undergoing a public land mobile network (PLMN) selection procedure, for example. The PLMN selection procedure is disclosed in detail in a standard specification proposed by $3^{rd}$ Generation Partnership Project (3GPP), i.e., "3GPP SPEC 23.122."

The mobile station performs such a network selection procedure including, but not limited to, any of the cases where a mobile station initially powers up; a mobile station has lost its service coverage and is restoring said coverage; a PLMN is searched during a roaming operation; a user manually selects a specific PLMN.

To perform the network selection procedure, the mobile station must first scan to determine which networks are currently on the air. For example, to recognize which PLMNs are on the air, the mobile station must scan for a Broadcast Control Channel (BCCH) carrier frequency and read specific information included in a corresponding carrier.

Since, initially, a mobile station is only able to recognize a receive-level of a corresponding frequency, the mobile station usually reads frequency information in an order beginning with a highest receive-level of the frequency.

However, all of the frequencies are not BCCH carriers and do not allow information to be provided. Therefore, the mobile station must scan all of the frequencies on the air to determine available networks. Such a conventional method is disadvantageous because it wastes electrical power and incurs long wait times for users.

SUMMARY OF THE INVENTION

The present invention provides a first method that can efficiently scan a network intended to be selected by a mobile station and a first mobile station using the first method.

The present invention further provides a second method that can scan for only BCCH carrier frequencies while skipping non-BCCH carrier frequencies in a mobile station, and provides a second mobile station using the second method.

In accordance with an embodiment of the present invention, a method is provided for scanning networks in a mobile station including: requesting a network selection, and scanning frequencies in an order starting from a highest receive-level of a scanned frequency; detecting a carrier having a network information during the scanning, and acquiring the network information; and sorting carrier frequencies and non-carrier frequencies of respective networks, based on the acquired network information.

In accordance with another embodiment of the present invention, a method is provided for scanning networks in a mobile station including: requesting a selection of a public land mobile network (PLMN), and scanning frequencies in an order beginning with a highest receive-level of the frequency; acquiring network information included in a first received broadcast control channel (BCCH) channel; determining whether a PLMN using the first received BCCH carrier frequency is a PLMN intended to be searched, based on the acquired network information; if a PLMN determined using the first BCCH carrier frequency is a PLMN intended to be searched, selecting the PLMN, otherwise sorting non-BCCH carrier frequencies based on the acquired network information; and then performing scanning frequencies while skipping the sorted non-BCCH carrier frequencies.

In accordance with another embodiment of the present invention, a mobile station comprises: a wireless communication unit for transmission and reception of a radio frequency (RF) signal; and a controller that scans frequencies using the wireless communication unit to select a network, wherein, the controller only scans carrier frequencies of networks.

BRIEF DESCRIPTION OF THE DRAWINGS

The features and advantages of the present invention will be more apparent from the following detailed description in conjunction with the accompanying drawings, in which.

DETAILED DESCRIPTION OF THE INVENTION

Hereinafter, embodiments of the present invention are described in detail with reference to the accompanying drawings. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

Figure 1:
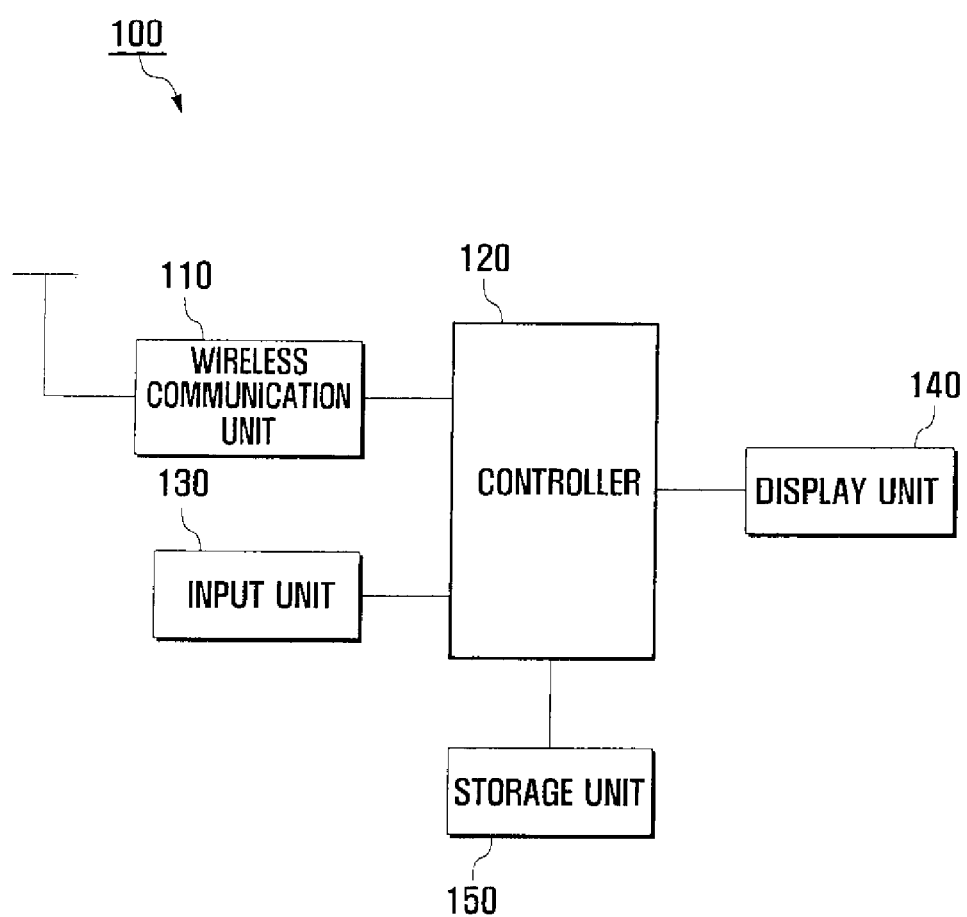
FIG. 1 is a view illustrating an example configuration of a mobile station according to an embodiment of the present invention.

FIG. 1 is a view illustrating an example of a configuration of a mobile station according to an embodiment of the present invention.

As illustrated in FIG. 1, the mobile station 100 is configured to include a wireless communication unit 110 for transmission and reception of a radio frequency (RF) signal, and a controller 120 for selection of a network by scanning frequencies through the use of the wireless communication unit 110 to select a network, wherein the controller 120 only scans carrier frequencies of networks.

In an alternative embodiment, the wireless communication unit 110 is implemented with an RF transceiver. In a further alternative embodiment, the wireless communication unit 110 includes a short-range wireless communication module that supports at least one of Infrared Data Association (IrDA) communication and Bluetooth communication, etc.

The controller 120 is preferably implemented with a mobile station modem (MSM). In another alternative embodiment, the controller 120 includes a codec for coding and decoding signals, such as multimedia signals, and an internal memory with a predetermined capacity.

The controller 120 scans frequencies using the wireless communication unit 110 whenever a network selection is requested. For example, the network selection is requested, among others, whenever: the mobile station 100 initially powers up; communication by the mobile station 100 is disconnected from a network and the mobile station attempts to reestablish communication with the network; a specific network is searched while using a specific service; and a user selects a specific network.

The controller 120 decodes the respective frequencies when scanning them, and reads information included in the decoded result. For example, when a carrier (for, example, BCCH carrier) frequency of a first network is read, the controller 120 acquires network information included in the read result.

The network information includes at least one of system information type 3 (SI3) and system information type 4 (SI4). The network information may include system information type 1 (SI1).

The SI3 and SI4 include network identification information (for example, local area identification) that_serves to identify networks, such as a mobile country code (MCC) or mobile network code (MNC). The controller 120 can read what frequency is associated with which network, based on the SI3 or SI4. That is, the controller 120 can determine whether a corresponding network is a desired network based on the SI3 or SI4.

The SI1 includes cell channel information (for example, a cell channel description), such as absolute radio frequency channel number (ARFCN) of frequencies that are used as traffic channels in a corresponding cell. Therefore, the controller 120 can read frequency information of a traffic channel, i.e., AFRCN, from the SI1, in which the traffic channel is used in a cell employing a network carrier. The controller 120 can sort carrier frequencies of networks and non-carrier frequencies, based on the SI1.

While scanning frequencies of networks, the controller 120 skips the non-carrier frequencies. The term "to skip" includes meanings that are to omit a decoding when scanning frequencies as well as to bypass a frequency scanning itself.

The controller 120 can skip the frequency scanning for non-carrier frequencies of networks (for example, a traffic channel frequency).

In an alternative embodiment, the mobile station 100 further includes an input unit 130 for inputting user's commands, a display unit 140 for displaying information, and a storage unit 150 for storing data.

The input unit 130 can be implemented with any of a keypad and a touch pad (touch screen). If the input unit 130 is implemented by a touch pad, it will be appreciated that the touch pad serves as the input unit 130 and the display pad 140 simultaneously.

In an alternative embodiment the storage unit 150 is configured to include both a non-volatile memory and a volatile memory. The storage unit 150 may further include a movable disk function allowing data to be easily and rapidly exchanged with other devices.

Although it is not shown, the mobile station 100 may further include units to provide additional functions, including but not limited to: a storage medium inserting portion that receives an external storage media, such as a memory card, for storage of data thereon; a camera module; a broadcast receiving module; an audio signal outputting unit, such as a speaker; an audio signal input unit, such as a microphone; a connection terminal for exchanging data with external digital devices; a power terminal; and a digital sound source reproduction module, such as an MP3 module.

With the spread of digital convergence, although the mobile communication terminals are too various to list their features in this description, it will be easily appreciated to those who skilled in the art that other units equivalent to the above-listed units may be further included in the mobile station 100 according to the present invention.

Figure 2:
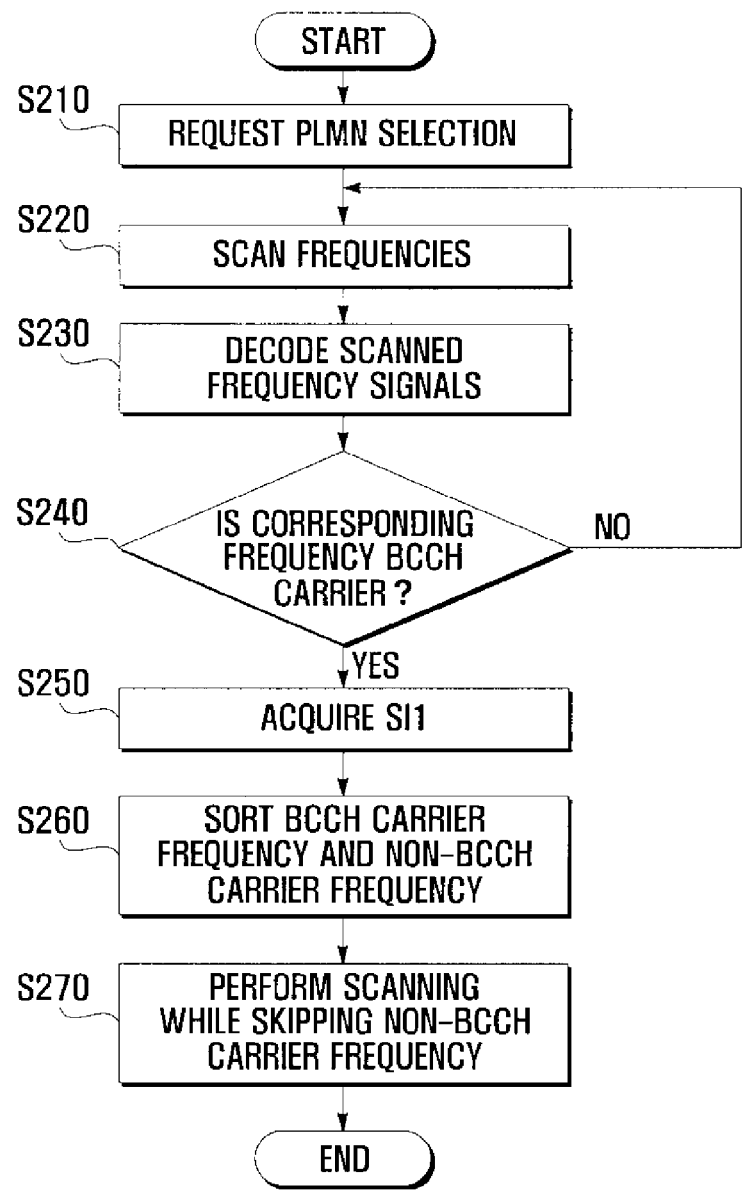
FIG. 2 is a flow chart illustrating an example of a method for scanning a network in a mobile station according to a first embodiment of the present invention.

FIG. 2 is a flow chart illustrating an example of a method for scanning a network in a mobile station, according to an embodiment of the present invention.

As shown in FIG. 2, when a selection of a PLMN is requested (S210), the controller 120 scans frequencies using the wireless communication unit 110 (S220). Scanning frequencies is performed in an order starting from the highest receive-level of the frequency. The controller 120 can skip the frequency scanning for non-BCCH carrier frequencies, such as a common call channel.

The controller 120 decodes received signals through scanned frequencies (S230). The controller 120 determines whether a corresponding frequency is a BCCH carrier based on the decoded information (S240). Steps S220 to S240 are repeatedly performed until the corresponding frequency is a BCCH carrier at step S240.

If the corresponding frequency is a BCCH carrier at step S240, the controller 120 acquires an SI1 included in the BCCH carrier (S250). The controller 120 sorts the BCCH carrier frequencies and non-BCCH carrier frequencies, based on information in the SI1 (S260).

After that, the controller 120 continues scanning frequencies, while skipping non-BCCH carrier frequencies, (S270).

Figure 3:
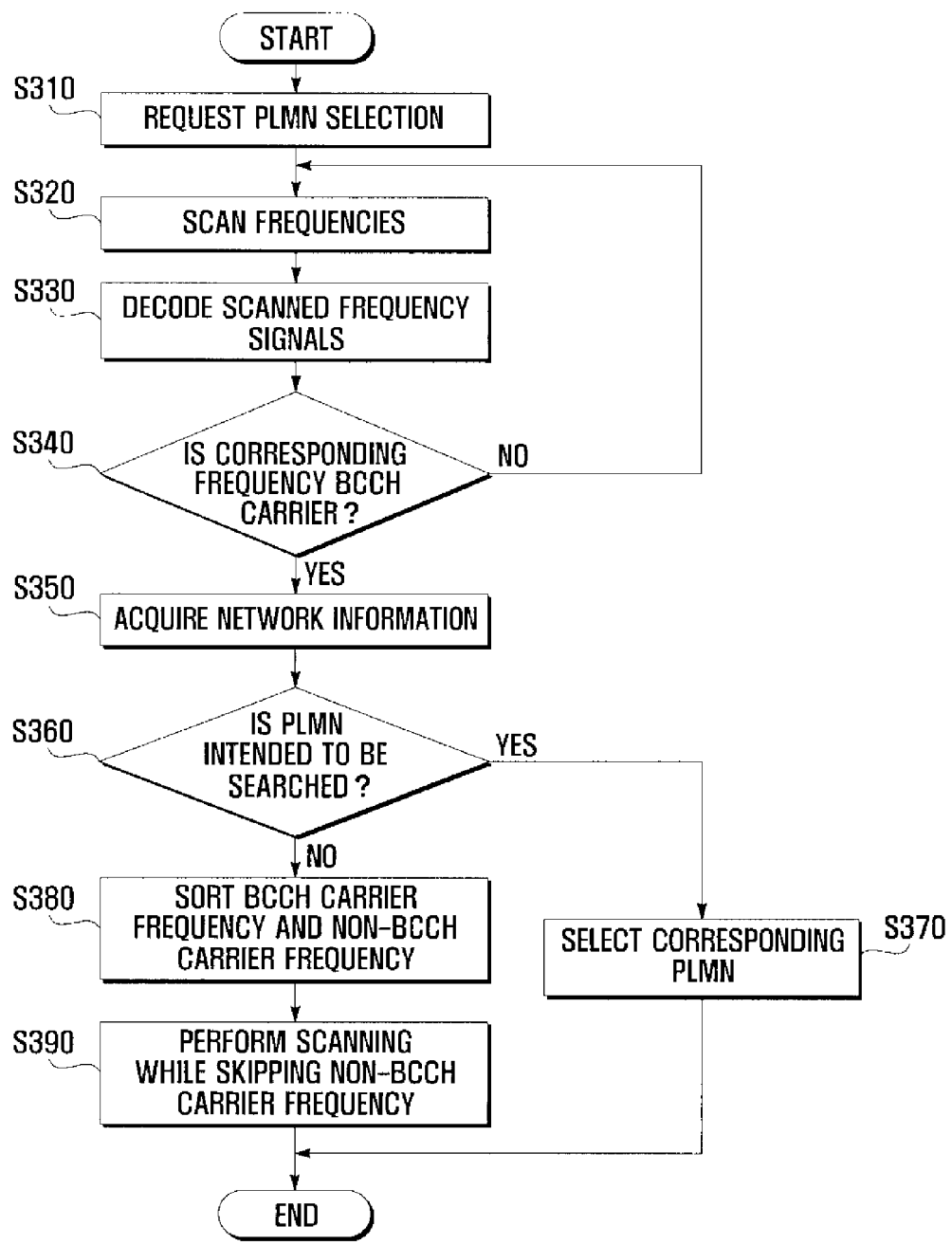
FIG. 3 is a flow chart illustrating an example of a method for scanning a network in a mobile station according to a second embodiment of the present invention.

FIG. 3 is a flow chart illustrating an example of a method for scanning a network in a mobile station, according to another embodiment of the present invention.

As shown in FIG. 3, when a selection of a PLMN is requested (S310), the controller 120 scans frequencies, in an order starting from the highest receive-level of the frequency, using the wireless communication unit 110 (S320). The controller 120 can skip the frequency scanning for non-carrier frequencies, such as a common call channel.

The controller 120 decodes read frequencies (S330). The controller 120 determines whether a corresponding frequency is a BCCH carrier based on the decoded information (S340). Steps S320 to S340 are repeatedly performed until the corresponding frequency is a BCCH carrier at step S340.

If the corresponding frequency is a BCCH carrier at step S340, the controller 120 acquires network information included in the BCCH carrier (S350). The network information may include at least one of SI3 and SI4. The network information also includes SI1.

After acquiring the network information, the controller 120 determines whether a PLMN of the corresponding frequency is a PLMN intended to be searched (S360). Here, the PLMN intended to be searched refers to an available PLMN or a specific PLMN, i.e., a PLMN that is designated by a user or is designated by default. The controller 120 can determine whether a corresponding PLMN is a PLMN to be searched, based on network identification information, such as MCC and MNC, which is included in the SI3 or the SI4.

If a corresponding PLMN is determined to be a PLMN to be searched at S360, the controller 120 selects a corresponding network (S370). After completing the selection of the PLMN, general registration procedures etc. are performed.

However, if a corresponding PLMN is not a PLMN to be searched at S360, the controller 120 sorts the BCCH carrier frequencies and non-BCCH carrier frequencies (S380). That is, the controller 120 can sort carrier frequencies of networks and non-carrier frequencies based on cell channel information, such as ARFCN of frequencies that are used for traffic channels included in the SI1.

After that, the controller 120 continues scanning frequencies (S370), until it reads a PLMN intended to be searched, while skipping non-BCCH carrier frequencies.

As described above, in all the embodiments of the present invention, only carrier frequencies of networks are scanned to select a network, and non-carrier frequencies are not scanned, thereby providing services rapidly and enhancing users' convenience.

In addition, the present invention can reduce frequency-scanning time, thereby decreasing the current consumption of a mobile station and extending its wait time.

Although exemplary embodiments of the present invention have been described in detail hereinabove, it should be understood that many variations and modifications of the basic inventive concept herein described, which may occur to those skilled in the art, will still fall within the sprit and scope of the exemplary embodiments of the present invention as defined in the appended claims.

What is claimed is:

1. A method for scanning at least one network in a mobile station comprising:
   requesting a network selection, and scanning at least one frequency in an order starting from the highest receive-level of each frequency, said scanning including:
      decoding each frequency to determine if the decoded frequency is a broadcast control channel (BCCH) carrier frequency or a non-BCCH carrier frequency; and
      responsive to the decoding determination, skipping any non-BCCH carrier frequency of said at least one scanned network;
   detecting at least one BCCH carrier frequency having network information during the scanning, and acquiring the network information through the at least one detected BCCH carrier frequency; and
   sorting the at least one detected BCCH carrier frequency of a respective network and any non-BCCH carrier frequency, based on the acquired network information, to skip any subsequently decoded non-BCCH barrier frequency.

2. The method of claim 1, wherein the at least one network comprises a public land mobile network (PLMN).

3. The method of claim 1, wherein the network information comprises a system information type 1 (SI1).

4. A method for scanning networks in a mobile station comprising:
   requesting a selection of a public land mobile network (PLMN), and scanning frequencies thereof in an order starting from a highest receive-level of each frequency of said scanned frequencies, said scanning including:
      decoding each frequency to determine if the decoded frequency is a broadcast control channel (BCCH) carrier frequency or a non-BCCH carrier frequency; and
      responsive to the decoding determination, skipping any non-BCCH carrier frequencies of the networks;
   acquiring network information included in a first received broadcast control channel (BCCH);
   determining whether a PLMN using a carrier frequency of the first received BCCH is a PLMN intended to be searched, based on the acquired network information;
   if a PLMN using the BCCH carrier frequency is a PLMN intended to be searched, selecting the PLMN, otherwise sorting the BCCH carrier frequencies and non-BCCH carrier frequencies based on the acquired network information,
   wherein scanning frequencies is performed while skipping any subsequently decoded non-BCCH carrier frequency included in the sorted non-BCCH carrier frequencies.

5. The method of claim 4, wherein scanning frequencies is performed until a PLMN using the first received BCCH carrier frequency is a PLMN intended to be searched.

6. The method of claim 5, wherein the PLMN intended to be searched comprises an available PLMN.

7. The method of claim 5, wherein the PLMN intended to be searched is one of a PLMN designated by a user and a PLMN designated as a default.

8. The method of claim 4, wherein the network information comprises at least one of a system information type 3 (SI3) and a system information type 4 (SI4).

9. The method of claim 8, wherein the determining further comprises basing said determining on at least one of a system information type 3 (SI3) and a system information type 4 (SI4).

10. The method of claim 4, wherein the network information further comprises a system information type 1 (SI1).

11. The method of claim 10, wherein sorting non-BCCH carrier frequencies is performed based on the system information type 1.

12. A mobile station comprising:
   a wireless communication unit to transmit and receive a radio frequency (RF) signal; and
   a controller to scan frequencies, using the wireless communication unit, to decode the scanned frequencies to produce a decoded result and to read information included in the decoded result to select a network, said scanning including:
   decoding each frequency to determine if the decoded frequency is a broadcast control channel (BCCH) carrier frequency or a non-BCCH carrier frequency; and
   responsive to the decoding determination, skipping any non-BCCH carrier frequencies of networks,
   wherein the controller sorts the BCCH carrier frequencies and non-BCCH carrier frequencies, based on the acquired network information and uses the wireless communication unit such that only BCCH carrier frequencies of networks are scanned, in order to skip any subsequently decoded non-BCCH carrier frequency, and,
   wherein, when reading a first carrier frequency of a network to produce a read result, the controller acquires network information included in the read result.

13. The mobile station of claim 12, wherein the network information further comprises system information type 1 (SI1).

14. The mobile station of claim 12, wherein the networks comprise a public land mobile network (PLMN).

15. The mobile station of claim 12, wherein the first carrier frequency comprises a broadcast control channel (BCCH) carrier frequency.

16. The mobile station of claim 12, wherein the controller skips previously known non-BCCH carrier frequencies of networks when the controller scans frequencies of said networks.

* * * * *